United States Patent Office 2,953,578
Patented Sept. 20, 1960

2,953,578

SULFONYL UREA COMPOUNDS AND A PROCESS OF MAKING SAME

Erich Haack, Heidelberg, Adolf Hagerdorn, Mannheim-Waldhof, Wilhelm Peschke, Mannheim, and Walter Aumueller and Hans Wagner, Frankfurt am Main, Germany, assignors to C. F. Boehringer & Soehne G.m.b.H., Mannheim-Waldhof, Germany, a corporation of Germany No Drawing. Filed Dec. 2, 1957, Ser. No. 699,915

Claims priority, application Germany Dec. 5, 1956

7 Claims. (Cl. 260—347.2)

The present invention relates to orally effective compounds for treating diabetes and more particularly to orally effective antidiabetic sulfonyl urea compounds, to a process of making them, and to a method of treating diabetes therewith.

At present, the treatment of human diabetes consists in dietary restriction and parenteral administration of insulin. During the last decade many attempts have been made to replace insulin by an orally effective antidiabetic agent. All these attempts, however, have failed, either because of the unreliable activity of such agents or because of the toxic side-effects encountered on their administration. For instance, diguanidine compounds with a high molecular alkylene residue, which have been orally administered as antidiabetic agents, have been found to be rather toxic and, therefore, unsatisfactory. Other compounds which exhibit oral antidiabetic activity such as the glucokinins have proved to be quite unreliable in their blood sugar lowering effect. A number of other compounds have shown some oral antidiabetic activity in animal experiments. They are, however, rather toxic and, therefore, have not been clinically tested in view of their disagreeable side-effects. Compounds of this type are heterocyclic derivatives of sulfanilamides and, more particularly, sulfanilamido thiodiazoles substituted by an ethyl, isopropyl or butyl radical.

None of the known blood sugar lowering compounds meets the requirements of a clinically useful, orally effective antidiabetic agent. Such an agent must combine low toxicity especially with regard to liver, adrenal glands, and central nervous system, with highly reliable antidiabetic action. Furthermore, such an agent must not exert a sustained antidiabetic effect at a persistently satisfactory level so that dangerous hypoglycemic conditions are avoided.

While the sulfanilyl thiodiazole compounds have only been tested on animals and have not been used in human therapy as orally effective antidiabetics, alkyl or, respectively, halogen substituted benzene sulfonyl urea compounds produce a reliable and uniform action on the human carbohydrate metabolism.

It is one object of the present invention to provide such orally effective antidiabetic sulfonyl urea compounds which meet all the above given requirements, which are substantially non-toxic and substantially free of obnoxious side-effects, which do not exert an initial intense, shock-like action but a rather prolonged uniform and fully reliable action on the carbohydrate metabolism of humans, and which, in contrast to sulfanilamido thiodiazoles, have not only proved of antidiabetic activity in animal experiments but also in the clinical treatment of human diabetes.

Another object of the present invention is to provide simple and effective processes of producing such new and valuable orally effective antidiabetic compounds.

A further object of the present invention is to provide a method of treating diabetes by orally administering to diabetic patients such orally effective antidiabetic compounds in predetermined dosage taken at predetermined periods of time.

Other objects of the present invention and advantageous features thereof will become apparent as the description proceeds.

In principle, orally effective antidiabetic compounds according to the present invention are benzene sulfonyl urea compounds of the following Formula I:

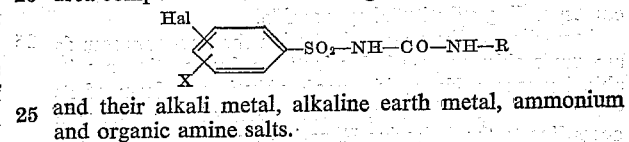

and their alkali metal, alkaline earth metal, ammonium and organic amine salts.

In said formula

Hal represents chlorine and bromine;
X represents hydrogen, a lower alkyl radical, a lower alkoxy group, chlorine or bromine; while
R represents an aliphatic or cycloaliphatic hydrocarbon radical containing between 3 and 8 carbon atoms, the chain of which may be interrupted by the hetero atom oxygen.

Sulfonyl urea compounds according to the above given Formula I may contain, for instance, the following amino group

—NH—R

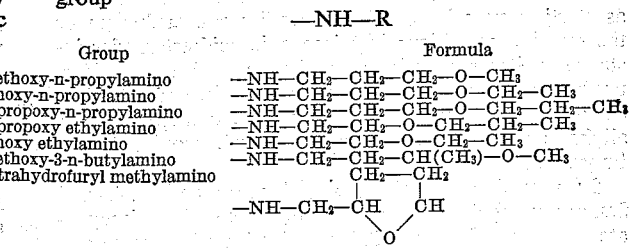

The blood sugar lowering effect of $N_2$-substituted sulfonyl urea compounds is not limited to compounds having the above defined substituents and forming the object of the present invention as follows from an investigation of the pharmacological properties of this group of sulfonamides. However, extent and character of the side-effects, to a large extent, appear depending upon the type of the $N_2$-substituent. For instance, sulfonyl urea compounds substituted by higher alkyl radicals are comparatively toxic. In contrast thereto, the presence of the hetero-atom oxygen in the $N_2$-substituent and the interruption of their carbon chain or ring by such a hetero-atom results in an entirely unexpected and very considerable reduction of the toxicity of such compounds without substantially diminishing their antidiabetic action.

The present invention, thus, is based upon the fact that presence of the hetero-atom oxygen in the molecule of the $N_2$ substituent results in a very considerable reduction of toxicity. This is proved by comparison with other sulfonyl urea compounds and, therefore, the theory may be advanced that this rule is of general validity, although the present invention is by no means limited to such a theory.

The compounds according to the present invention do not possess a bacteriostatic action comparable to that of sulfanilamides. This lack of bacteriostatic activity can sometimes be of advantage when using the new compounds as antidiabetic agents. For instance, the intestinal flora is not affected by such compounds and, furthermore, there is no danger that pathogenic germs might become resistant to sulfanilamides when using such compounds continuously.

Sulfonyl urea compounds according to the above given Formula I are produced, for instance, according to methods as they are ordinarily employed in the synthesis of substituted urea compounds. However, the simplest method, namely reaction of a suitable benzene sulfonyl chloride with a correspondingly substituted urea compound does not yield satisfactory results and has the disadvantage that the yield of the new benzene sulfonyl urea compounds is quite low and that a considerable number and amount of by-products is formed. The reason for the low yield is that the sulfonyl group not only combines with the nitrogen atom of the urea compound but that it also and preferably combines with its oxygen atom, thereby yielding an isourea compound. The resulting isourea compound splits off sulfonic acid and forms the corresponding substituted cyanamide.

According to the present invention the new compounds are preferably prepared, for instance, by reacting a suitable benzene sulfonamide, preferably in the form of its sodium or potassium salt, with an ester of isocyanic acid according to the following Equation A:

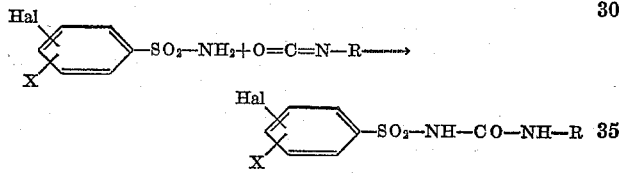

wherein
Hal, X, and R represent the same members as given in Formula I.

In place of the isocyanate, compounds may also be used as starting material which are readily convertible under the reaction conditions into isocyanic acid esters, for instance, suitable substituted carbamic acid halogenides, urethanes, $N_2$-substituted urea compounds, and their $N_1$-acylated derivatives which, preferably, contain a lower aliphatic acyl group, such as an acetyl, propionyl, and butyroyl, or benzoyl group.

By reversing the above mentioned reaction A and first producing the corresponding benzene sulfonyl isocyanate compound from a suitable derivative of a phenyl sulfonamide, the same benzene sulfonyl urea compound is obtained by reacting said isocyanate compound with a suitable amino compound according to the following Equation B:

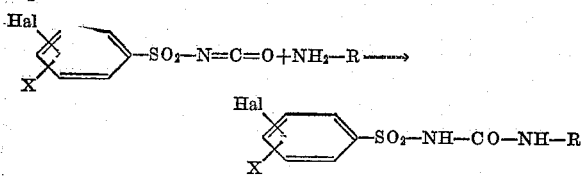

Compounds which are readily convertible into such sulfonyl isocyanate compounds under the reaction conditions and which may be used in place of the sulfonyl isocyanates, are, for instance, sulfonyl urethanes, sulfonyl thiourethanes, sulfonyl carbamic acid halogenides, sulfonyl urea compounds and their $N_2$-acylated derivatives. Of the last group of compounds the preferred compounds are the disulfonyl urea compounds and such $N_1$-substituted sulfonyl urea compounds which contain a lower aliphatic acyl group at the $N_2$-atom, such as the acetyl, propionyl, and butyroyl group or the benzoyl group.

The above mentioned methods, however, are not the only methods which yield the desired compounds. For instance, a substituted isourea alkyl ether can be reacted with a benzene sulfonic acid chloride substituted by the groups Hal and X and the resulting benzene sulfonyl isourea compound is then split up by treatment with hydrogen halide of the formula HHal to an alkyl halogenide and the desired sulfonyl urea compound according to the following Equation C:

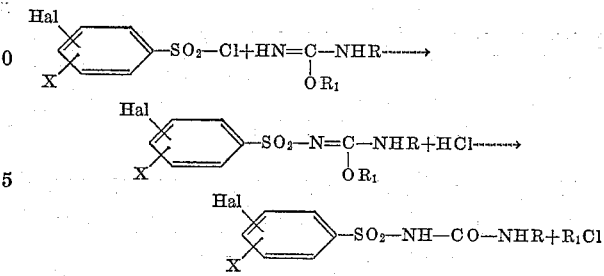

Furthermore, the corresponding sulfonylthiourea compounds may be used as starting materials wherein sulfur is exchanged by oxygen by means of oxidizing agents according to the following Equation D; the reaction, most probably proceeds as indicated:

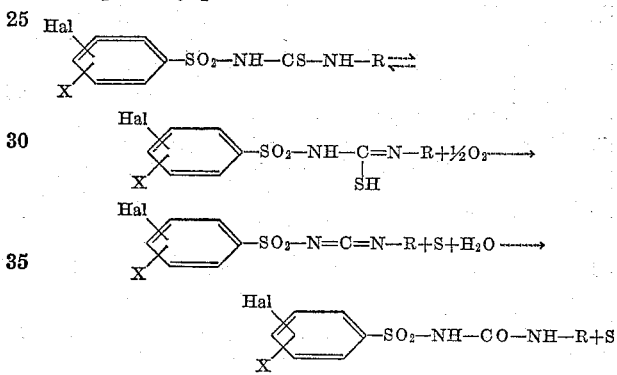

The following examples serve to illustrate preferred methods of producing the new sulfonyl urea compounds without however, limiting the same thereto.

*Example 1.—$N_1$-(4-chloro benzene sulfonyl)-$N_2$-(3-methoxy propyl) urea from di-(4-chloro benzene sulfonyl) urea and methoxypropylamine*

79 g. of di-(4-chloro benzene sulfonyl) urea prepared from p-chloro benzene sulfonamide and phosgene in alkaline solution, are suspended in 79 cc. of water while stirring. 19 g. of 3-methoxy propylamine are added. After several hours, the 3-methoxy propylamine salt of di-(4-chloro benzene sulfonyl) urea crystallizes. The yield is 88 g. The product melts at 132–137° C. with decomposition.

88 g. of the 3-methoxy propylamine salt of di-(4-chloro benzene sulfonyl) urea are heated in an oil bath at 116° C. for 82 minutes. A clear melt is obtained. After cooling, the melt is mixed with 200 cc. of water and 10 cc. of concentrated ammonium hydroxide solution. The chloro benzene sulfonamide which is formed as by-product by thermal decomposition of the 3-methoxy propylamine salt is filtered off. The filtrate is heated to 40° C., acidified to a pH of 6.0 and, after addition of 5 g. of charcoal, stirred for a short period of time. After filtration, the solution is acidified. 39 g. $N_1$ (4-chloro benzene sulfonyl)-$N_2$-(3-methoxy propyl) urea is obtained. The compound melts at 109–111° C.

*Example 2.—$N_1$-(4-chloro benzene sulfonyl)-$N_2$-(2-ethoxy ethyl) urea*

By using the same amount of 2-ethoxy ethylamine, in place of 3-methoxy propylamine, and proceeding otherwise in the same manner as described hereinabove in Example 1, $N_1$-(4-chloro benzene sulfonyl)-$N_2$-(2-ethoxy ethyl) urea is produced. The compound melts at 108–110° C.

*Example 3.—$N_1$-(4-chloro benzene sulfonyl)-$N_2$-(3-methoxy propyl) urea from N-(4-chloro benzene sulfonyl) carbamic acid ethyl ester and methoxy propylamine*

N-(4-chloro benzene sulfonyl) carbamic acid ethyl ester is prepared from p-chloro benzene sulfonamide and chloroformic acid ethyl ester in acetone and in the presence of powdered potassium carbonate. The carbamic acid ester melts at 92–93° C.

50 g. of said carbamic acid ester and 21 g. of 3-methoxy propylamine are boiled under reflux in 150 cc. of glycol mono-ethyl ether for 8 hours. The solvent is distilled off in a vacuum and the residue is dissolved in 500 cc. of water by the addition of sodium hydroxide solution. The resulting solution is cleared by means of charcoal. After filtration, the solution is carefully acidified by the addition of hydrochloric acid. First a somewhat pasty precipitate is obtained which crystallizes after stirring in the cold for a short period of time. The crystals are filtered by suction, thoroughly washed with water, and dissolved in 350 cc. of dilute ammonium hydroxide solution. The solution is cleared by means of charcoal. After removing the charcoal, the filtrate is acidified by the addition of hydrochloric acid. $N_1$-(4-chloro benzene sulfonyl)-$N_2$-(3-methoxy propyl) urea precipitates in a good yield and melts on recrystallization from acetonitrile at 111–112° C.

*Example 4.—$N_1$-(3-chloro-4-methyl benzene sulfonyl)-$N_2$(3-methoxy propyl) urea*

N-(3-chloro-4-methyl benzene sulfonyl) carbamic acid ethyl ester is prepared by reacting 2-chloro toluene-4-sulfonamide and chloro formic acid ethyl ester in acetone in the presence of pulverized potassium carbonate. The resulting products melts at 81–83° C.

70 g. of said carbamic acid ester, 34 g. of 3-methoxy propylamine, and 150 cc. of glycol mono-methyl ether are boiled under reflux for 8 hours. The solvent is distilled off under reduced pressure. The resulting residue is dissolved in dilute sodium hydroxide solution. The solution is cleared by means of charcoal. After removal of the charcoal, the reaction mixture is acidified by careful addition of hydrochloric acid. First a paste-like precipitate is obtained which crystallizes after standing in the cold for a short period of time. The crystals are filtered by suction, washed with water, and stirred for some time in one liter of dilute ammonium hydroxide solution. To clear the solution, charcoal is added. After removal of the charcoal by filtration, the resulting filtrate is again acidified by the addition of hydrochloric acid. $N_1$-(3-chloro-4-methyl benzene sulfonyl)-$N_2$-(3-methoxy propyl) urea precipitates in the form of crystals. They are filtered with suction, thoroughly washed with water, and recrystallized from acetonitrile. The melting point of the compound is 106–107° C.

*Example 5.—$N_1$-(3-chloro-4-methoxy benzene sulfonyl)-$N_2$-(3-methoxy-propyl) urea*

N-(3-chloro-4-methoxy benzene sulfonyl) carbamic acid methyl ester is prepared by reacting 4-methoxy-3-chloro benzene sulfonamide with chloro formic acid methyl ester in acetone in the presence of powdered potassium carbonate. The product melts at 142–144° C.

19.6 g. of said carbamic acid ester is mixed with 6.3 g. of 3-methoxy propylamine. The mixture is heated in an oil bath at about 130° C. for 35 minutes. A clear melt is formed, while methanol is split off. On cooling and trituration with acetic acid ethyl ester, crystallization sets in. The crystals are filtered off by suction and are recrystallized from aqueous ethanol. $N_1$-(3-chloro-4-methoxy benzene sulfonyl)-$N_2$-(3-methoxy propyl) urea is obtained in a good yield. The compound melts at 120–122° C.

*Example 6.—$N_1$-(3-chloro-4-methoxy benzene sulfonyl)-$N_2$-(3-ethoxy propyl) urea*

A mixture of 27.9 g. of N-(3-chloro-4-methoxy benzene sulfonyl) carbamic acid methyl ester prepared as described in Example 5 and 10.3 g. of 3-ethoxy propylamine are allowed to react in the same manner as described in Example 5. $N_1$-(3-chloro-4-methoxy benzene sulfonyl)-$N_2$-(3-ethoxy propyl) urea is obtained in a good yield. On recrystallization from aqueous ethanol the resulting compound melts at 135–137° C.

*Example 7.—$N_1$-(3-chloro-4-toluene sulfonyl)-$N_2$-(3-methoxy butyl) urea*

83 g. of (3-chloro-4-toluene sulfonyl)ethyl urethane, 60 cc. of dimethylformamide, and 30 g. of 3-methoxy butylamine are heated together at 105–110° C. for 3 hours. After cooling, the solution is poured into 1 l. of water. The reaction product separates at first as an oil which crystallizes after a short period of time. The crystals are filtered with suction, washed well with water, and dried in a vacuum. The yield is 70% of the theoretical amount. After recrystallization from propanol, the final product melts at 126–127° C.

*Example 8.—$N_1$-(4-chloro benzene sulfonyl)-$N_2$-(α-tetrahydrofurfuryl) urea*

$N_1$-(4-chloro benzene sulfonyl)-$N_2$-(α-tetrahydrofurfuryl) thiourea is prepared by reacting 4-chloro benzene sulfonamide with α-tetrahydrofurfuryl isothiocyanate (boiling point: 130–134° C./30–35 mm.) in the presence of potassium carbonate and acetone. The compound melts at 136–138° C.

33.5 g. of said thiourea compound are dissolved in acetone. A solution of 7.5 g. of sodium nitrite in 70 cc. of water is added with stirring within 30 minutes. While stirring is continued and the mixture is cooled, 60 cc. of 5 N acetic acid are added dropwise thereto within 40 minutes. Stirring is continued at room temperature for 2 to 3 hours. On addition of water, a compound is precipitated which is filtered with suction and is dissolved in dilute ammonia. Undissolved sulfur is separated by filtration. The filtrate is acidified by the addition of dilute hydrochloric acid. The precipitated crystals are filtered with suction, washed with water, and recrystallized from 50% aqueous methanol. $N_1$-(4-chloro benzene sulfonyl)-$N_2$-(α-tetrahydrofurfuryl) urea is obtained in a good yield. The compound melts at 125–127° C.

*Example 9.—$N_1$(4-bromo benzene sulfonyl)-$N_2$-(3-methoxy propyl) urea*

A mixture of 29.4 g. of N-(4-bromo benzene sulfonyl) carbamic acid methyl ester and 8.9 g. of 3-methoxy propylamine is heated at about 120° C. for 35 minutes. The resulting molten mass is recrystalized from 50% aqueous methanol. Crystallized $N_1$-(4-bromo benzene sulfonyl)-$N_2$-(3-methoxy propyl) urea is obtained in a good yield. It has a melting point between 110° C. and 112° C.

*Example 10.—$N_1$-(2-methyl-6-chloro benzene sulfonyl)-$N_2$-(3-methoxy propyl) urea*

10.3 g. of 2-methyl-6-chloro benzene sulfonamide, 8.7 g. of $N_1$-acetyl-$N_2$-(3-methoxy propyl) urea, and 6.9 g. of finely powdered potassium carbonate are intimately mixed and heated in an oil bath at 150° C. for 1½ hours. After cooling, the reaction product is triturated with 1% ammonia. Undissolved residue is filtered off. The filtrate is acidified by the addition of dilute hydrochloric acid, $N_1$-(2-methyl-6-chloro benzene sulfonyl)-$N_2$-(3-methoxy propyl) urea separates in the form of crystals. They are filtered with suction and recrystallized from aqueous ethanol. The compound melts at 128–130° C.

*Example 11.—$N_1$-(2-methyl-6-chloro benzene sulfonyl)-$N_2$-(3-methoxy propyl) urea*

2-methyl-6-chloro benzene sulfonyl carbamic acid methyl ester is prepared by reacting 2-methyl-6-chloro benzene sulfonamide with chloroformic acid methyl ester in acetone in the presence of potassium carbonate. The resuling compound has a melting point of 180–181° C.

13.2 g. of said carbamic acid ester compound are heated with 4.5 g. of 3-methoxy propylamine at 125–130° C. for one hour. Further working up of the reaction mixture is carried out as described in Example 10 by treating the molten mixture with ammonia, precipitation by the addition of hydrochloric acid, and recrystallization from ethanol. $N_1$-(2-methyl-6-chloro benzene sulfonyl)-$N_2$-(3-methoxy propyl) urea is obtained in a good yield.

*Example 12.—$N_1$-(3,4-dichloro benzene sulfonyl)-$N_2$-(3-methoxy propyl) urea*

39.6 g. of N-(3-methoxy propyl) urea and 37.8 g. of dimethyl sulfate are mixed and heated on a steam bath. After a few minutes, the temperature rises to 132° C. and small bubbles are formed. After cooling, the highly viscous mass is dissolved in 100 cc. of water. While cooling to room temperature, 130 g. of potassium carbonate are added to the solution. 81 g. of 3,4-dichloro benzene sulfonyl chloride are added with stirring within 45 minutes. Thereby, the temperature rises to about 60° C. Stirring is continued for 2 hours. The resulting oily product is triturated several times with water whereby the wash waters are decanted each time. 180 cc. of concentrated hydrochloric acid are added and the mixture is heated to 60° C. After about 30 minutes evolution of gases has ceased. After cooling, the supernatant hydrochloric acid is decanted. The resuling product is washed twice with water, the wash waters being decanted each time. The resulting residue is dissolved in 1% ammonia. After clarification by means of charcoal, the filtrate is acidified by the addition of dilute hydrochloric acid. An oily precipitate is obtained which crystallizes slowly. The crystals are filtered with suction. The resulting $N_1$-(3,4-dichloro benzene sulfonyl)-$N_2$-(3-methoxy propyl) urea is recrystallized from ethanol. Said compound has a melting point of 111–112° C.

*Example 13.—$N_1$-(4-chloro benzene sulfonyl)-$N_2$-(3-methoxy propyl) urea*

20.2 g. of 4-chloro benzene sulfonyl isocyanate (boiling point: 110–111° C./0.18 mm.), prepared from 4-chloro benzene sulfonamide and phosgene, are dissolved in 15 cc. of anhydrous dioxane. A solution of 9 g. of 3-methoxy propylamine in 15 cc. of dioxane is added drop by drop at room temperature with stirring. After the addition is completed, stirring is continued at 80° C. for one hour. The solution is concentrated in a vacuum. The resulting $N_1$-(4-chloro benzene sulfonyl)-$N_2$-(3-methoxy propyl) urea is precipitated by the addition of water. The precipitate is dissolved in about 1% ammonia. The solution is treated with charcoal, filtered, and acidified by the addition of dilute hydrochloric acid. $N_1$-(4-chloro benzene sulfonyl)-$N_2$-(3-methoxy propyl) urea is obtained with a good yield. After recrystallization from acetonitrile, the compound melts at 111–112° C.

*Example 14.—$N_1$-(3,4-dichloro benzene sulfonyl)-$N_2$-(3-methoxy propyl) urea*

3.4 g. of $N_1$-(3,4-dichloro benzene sulfonyl)-$N_2$-butyryl urea having a melting point of 183–184° C., are reacted in acetic acid ethyl ester with 1 g. of 3-methoxy propylamine to give the corresponding salt. Said 3-methoxy propylamine salt is filtered off by suction. It melts at about 173° C. when heated quickly to that range of temperature. It is heated in an oil bath at 150° C. After the reaction mixture has been molten after about 5 to 10 minutes, the temperature is allowed to drop to 125–130° C. Heating requires all in all about 60 minutes. After cooling, the reaction mixture is dissolved in about 1% ammonia. The solution is acidified by the addition of acetic acid. The precipitated oily product crystallizes slowly. The crystals are filtered with suction and are recrystallized from aqueous ethanol. The resulting $N_1$-(3,4-dichloro benzene sulfonyl)-$N_2$-(3-methoxy propyl) urea has a melting point of 111–112° C.

*Example 15.—$N_1$-(4-chloro benzene sulfonyl)-$N_2$-(3-methoxy propyl) urea*

24 g. of p-chloro benzene sulfonyl urea which has been prepared by reacting 4-chloro benzene sulfonamide with potassium cyanate and which has a melting point of 180–182° C., are mixed well with 12.5 g. of 3-methoxy propylamine hydrochloride and heated in an oil bath of a temperature of 150° C. for 60 minutes. After cooling, the reaction mixture is dissolved in dilute ammonia. Undissolved matter is removed by filtration. The filtrate is acidified by the addition of acetic acid. 18 g. of $N_1$-(4-chloro benzene sulfonyl)-$N_2$-(3-methoxy propyl) urea are obtained. The compound melts at 109–111° C.

As stated hereinabove, the new benzene sulfonyl urea compounds have proved to be orally highly effective agents useful in the treatment of diabetes. The preferred daily dose is between about 0.5 g. and about 2.0 g. and the initial dose at the beginning of the treatment is between about 1.0 g. and about 4.0 g. The minimum dose of 0.5 g. per day is required to produce the desired blood sugar level.

The acute toxicity of the sulfonyl urea compounds according to the present invention is quite low. The $DL_{50}$ of $N_1$-(4-chloro benzene sulfonyl)-$N_2$-(3-methoxy propyl) urea, for instance, is 1.85 g. per kg. mouse; the $DL_{50}$ of $N_1$-(4-methyl-3-chloro benzene sulfonyl)-$N_2$-(3-methoxy butyl) urea is 0.94 g. per kg. mouse.

The blood sugar lowering effect of $N_1$-(4-chloro benzene sulfonyl)-$N_2$-(3-methoxy propyl) urea which remains in the body for a half-life period of 4.3 hours, is three times higher than that of $N_1$-sulfanilyl-$N_2$-(n-butyl) urea. Compared with the same compound, the blood sugar lowering effect of $N_1$-(4-methyl-3-chloro benzene sulfonyl)-$N_2$-(3-methoxy butyl) urea is twice as high.

Preferably, the new benzene sulfonyl urea compounds according to the present invention are administered per-orally in a pharmaceutical carrier in standard form as tablets, pills, lozenges, dragees and the like shaped and/or compressed preparations. It is also possible to produce emulsions or suspensions of said compound in water or aqueous media such as unsweetened fruit juices and by means of suitable emulsifying or dispersing agents. The new antidiabetic agents may furthermore be employed in the form of powders filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of the new benzene sulfonyl urea compounds in water or with a solution thereof in an organic solvent, such as ethanol, methanol, acetone, and others and then removing the water or solvent.

When preparing tablets, pills, dragees, and the like shaped and/or compressed preparations, the commonly used diluting, binding, and disintgerating agents, lubricants, and other tabletting adjuvants are employed, provided they are compatible with the new benzene sulfonyl urea compounds. Such diluting agents and other excipients are, for instance, sugar, lactose, levulose, starch, bolus alba, as disintegrating and binding agents gelatin, gum arabic, yeast extract, agar, tragacanth, methyl cellulose, pectin, and as lubricants stearic acid, talc, magnesium stearate, and others.

It is, of course, also possible to administer the new benzene sulfonyl urea compounds in the form of suppositories, whereby the commonly used suppository vehicles, such as cocoa butter are used.

The amounts of the new benzene sulfonyl urea compounds in antidiabetic pharmaceutical units or dosage according to the present invention may be varied. It is also possible to administer several unit dosage forms at the same time. Since a daily dose of 0.5 g. is the minimum dose to be administered, it is advisable that not less than about 1% and preferably not less than about 5% of the new benzene sulfonyl urea compounds be present in compositions according to the present invention. It is, however, advantageous to prepare tablets and the like shaped and/or compressed preparations with a minor proportion of diluent and tabletting adjuvants and a major proportion of the new benzene sulfonyl urea compounds. Tablets containing from 250 mg. to 750 mg. of said compound are particularly useful in administering the required dose.

The following examples of compositions containing the new benzene sulfonyl urea compounds as they are to be used in diabetes therapy serve to illustrate the present invention without, however, limiting the same thereto.

*Example 16*

10.0 kg. of $N_1$-(4-chloro benzene sulfonyl)-$N_2$-(3-methoxy propyl) urea are moistened with 3500 cc. of a 1% gelatin solution and are kneaded in a kneader until its initial crystal structure has disappeared. The resulting mixture is granulated and is dried in an air current at about 40° C. 10.350 kg. of granulate is intimately mixed, in a mixing apparatus, with 1550 g. of corn starch and 100 g. of magnesium stearate and compressed by means of a revolving tabletting press to tablets having a diameter of 13 mm. and a weight of 0.6 g. Each tablet contains about 0.5 g. of $N_1$-(4-chloro benzene sulfonyl)-$N_2$-(3-methoxy propyl) urea.

*Example 17*

Cores of dragees with convex surfaces composed of 0.25 g. of $N_1$-(4-chloro benzene sulfonyl)-$N_2$-(2-ethoxy ethyl) urea and of 0.0325 g. of potato starch containing 10% of stearic acid are prepared by compressing such a mixture. Said cores are coated in a dragee coating vessel by means of sugar sirup and talcum. The last dragee coating contains aromatic, sweetening, and coloring agents and is polished and, if desired, provided with a thin metal foil layer.

*Example 18*

0.25 g. of pulverized pure $N_1$-(4-chloro benzene sulfonyl)-$N_2$-(3-methoxy propyl) urea are filled into one half of a gelatin capsule and the other half of said capsule is fit thereover. Both halves are then united and sealed to form a gelatin capsule.

*Example 19*

10 kg. of $N_1$-(3-chloro-4-methyl benzene sulfonyl)-$N_2$-(3-methoxy propyl) urea are finely pulverized and are mixed in a kneading device with a vegetable or suitable mineral oil in an amount sufficient to produce a supsension which is fluid and can be ejected through a canula. Said suspension is injected, by means of a suitable machine, in a predetermined dosage between two plastic foils and the foils are seamlessly welded with each other. The resulting capsule is completely filled with $N_1$-(3-chloro-4-methyl benzene sulfonyl)-$N_2$-(3-methoxy propyl) urea, for instance, in an amount of 0.30 g. per capsule. The foils or the oil can be dyed, rendered opaque, or can otherwise be rendered distinctive.

*Example 20*

10 kg. of $N_1$-(3-chloro-4-methyl benzene sulfonyl)-$N_2$-(3-methoxy propyl) urea are mixed in a kneader with 2.5 kg. starch and 1.38 kg. lactose. This mixture is then further kneaded with a mucilage made from 4 liters of water and 120 g. of gum tragacanth. The resultant moist material is passed through an extrusion press and then through a pill-making machine which gives moist pills weighing 0.18 g.

After removal of the moisture in a drier the pills weigh 0.14 g. and have an active material content of 0.1 g.

Instead of gum tragacanth one can employ other binding materials such as methyl cellulose, gum arabic or magnesium aluminum silicate (Veegum Vandebilt New York 17). It is also possible, by employing different rollers in the pill-making machine, to produce pills with a larger active material content.

*Example 21*

A 10% suspension of finely pulverized $N_1$-(3-chloro-4-methoxy benzene sulfonyl)-$N_2$-(3-methoxy propyl) urea in an aqueous 20% sugar solution is prepared. The sugar solution contains methyl cellulose in an amount sufficient to produce a viscous suspension. Aromatic substances such as oil of cinnamon, aniseed oil, vanillin, or vanilla extract and, if desired, dyestuffs, are added thereto. The suspension is filled into bottles or tubes. 10 cc. thereof contain about 1 g. of $N_1$-(3-chloro-4-methoxy benzene sulfonyl)-$N_2$-(3-methoxy propyl) urea.

In place of a 20% sugar solution there can be used a 50% levulose solution whereby the amount of $N_1$-(3-chloro-4-methoxy benzene sulfonyl)-$N_2$-(3-methoxy propyl) urea in the resulting suspension can be increased to 15%. It is, of course, also possible to prepare suspensions of this type which contain only 5% of $N_1$-(3-chloro-4-methoxy benzene sulfonyl)-$N_2$-(3-methoxy propyl) urea. The sugar may be completely omitted and/or in its place there may be used suitable fruit juices such as orange, grapefruit, tomato juice or the like. As a thickening agent may be used a suitable magnesium aluminum silicate instead of methyl cellulose.

*Example 22*

Finely pulverized $N_1$(3-chloro-4-methoxy benzene sulfonyl)-$N_2$-(3-methoxy propyl) urea is intimately mixed with a molten suppository vehicle of a fatty ester or polyethylene-glycol base. The mixture is poured into a suppository mold. The resulting suppositories contain about 1.0 g. of $N_1$-(3-chloro-4-methoxy benzene sulfonyl)-$N_2$-(3-methoxy propyl) urea.

We claim:

1. $N_1$-(4-chloro benzene sulfonyl)-$N_2$-(3-methoxy propyl) urea.
2. $N_1$-(4-chloro benzene sulfonyl)-$N_2$-($\alpha$-tetrahydrofurfuryl) urea.
3. $N_1$-(4-bromo benzene sulfonyl)-$N_2$-(3-methoxy propyl) urea.
4. $N_1$-(3-chloro-4-methyl benzene sulfonyl)-$N_2$-(3-methoxy propyl) urea.
5. $N_1$-(3-chloro-4-methyl benzene sulfonyl)-$N_2$-(3-methoxy butyl) urea.
6. N-p-chlorbenzenesulfonyl-N'-lower alkoxy-lower alkyl urea.

7. The benzene sulfonyl urea compound of the formula

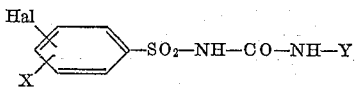

wherein

Hal is an atom selected from the group consisting of chlorine and bromine;

X is a member selected from the group consisting of hydrogen, lower alkyl, lower alkoxy, chlorine, and bromine; and Y is a member selected from the group consisting of lower alkoxy lower alkyl with 3 to 8 carbon atoms and tetrahydrofurfuryl.

References Cited in the file of this patent

Kurzer: Chem. Reviews, vol. 50, pp. 1–27 (1952).
Franke et al.: Deutsche Med. Woch., vol. 80, p. 1449 (1955).
Erhart: Die Naturwissenschaften, vol. 43, p. 93 (Feb. 1956).

UNITED STATES PATENT OFFICE

CERTIFICATION OF CORRECTION

Patent No. 2,953,578 September 20, 1960

Erich Haack et al.

It is hereby certified that error appears in the above numbered patent requiring correction and that the said Letters Patent should read as corrected below.

Column 2, lines 45 to 48, the formula should appear as shown below instead of as in the patent:

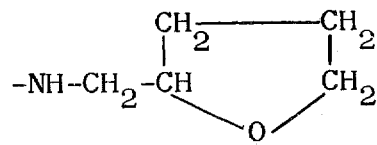

Signed and sealed this 30th day of May 1961.

(SEAL)
Attest:

ERNEST W. SWIDER
Attesting Officer

DAVID L. LADD
Commissioner of Patents